United States Patent
Pesyna et al.

(10) Patent No.: US 8,245,495 B2
(45) Date of Patent: Aug. 21, 2012

(54) MECHANISM FOR A VECTORING EXHAUST NOZZLE

(75) Inventors: Kenneth M. Pesyna, Carmel, IN (US); Jeffrey P. Henkle, Indianapolis, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 87 days.

(21) Appl. No.: 12/951,872

(22) Filed: Nov. 22, 2010

(65) Prior Publication Data
US 2011/0095099 A1   Apr. 28, 2011

Related U.S. Application Data

(62) Division of application No. 11/451,835, filed on Jun. 13, 2006, now Pat. No. 7,836,681.

(51) Int. Cl.
*B63H 11/00* (2006.01)
(52) U.S. Cl. ............................ 60/204; 60/228; 244/23 A
(58) Field of Classification Search ............... 60/204, 60/226.2, 228, 230; 239/265.11, 265.19; 244/12.4, 12.5, 23 A, 23 D
See application file for complete search history.

(56) References Cited

U.S. PATENT DOCUMENTS

| | | | |
|---|---|---|---|
| 3,299,638 A | 1/1967 | Santamaria et al. | |
| 3,638,884 A | 2/1972 | Timperman | |
| 3,640,469 A | 2/1972 | Hayes et al. | |
| 3,912,201 A | 10/1975 | Bradbury | |
| 3,920,203 A | 11/1975 | Moorehead | |
| 4,230,292 A | 10/1980 | Van Nimwegen | |
| 4,474,345 A * | 10/1984 | Musgrove | 244/53 R |
| 4,760,960 A | 8/1988 | Ward et al. | |
| 4,798,328 A | 1/1989 | Thayer et al. | |
| 4,828,173 A | 5/1989 | Guerty | |
| 4,948,072 A | 8/1990 | Garland et al. | |
| 5,255,850 A * | 10/1993 | Cockerham | 239/265.29 |
| 5,390,877 A | 2/1995 | Nightingale | |
| 5,464,175 A | 11/1995 | Short | |
| 5,485,958 A | 1/1996 | Nightingale | |
| 5,706,649 A | 1/1998 | Robinson et al. | |
| 5,769,317 A * | 6/1998 | Sokhey et al. | 239/1 |
| 6,105,901 A | 8/2000 | Ulanoski et al. | |
| 6,260,794 B1 | 7/2001 | Rowe | |
| 6,318,668 B1 | 11/2001 | Ulanoski et al. | |
| 6,382,559 B1 | 5/2002 | Sutterfield et al. | |
| 2003/0001046 A1 | 1/2003 | Carpenter | |

* cited by examiner

*Primary Examiner* — Phutthiwat Wongwian
(74) *Attorney, Agent, or Firm* — Krieg DeVault LLP

(57) ABSTRACT

A nozzle device defines a passageway including an outlet to discharge working fluid to produce thrust. This device includes a vectoring mechanism having three or more vanes pivotally mounted across the passageway and a linkage pivotally coupling the vanes together. This linkage includes a first arm fixed to a first one of the vanes to pivot therewith about a first pivot axis, a second arm and a third arm fixed to a second one of the vanes to pivot therewith about a second pivot axis, and a fourth arm fixed to a third one of the vanes to pivot therewith about a third pivot axis. A first connecting link pivotally couples the first arm and the second arm together, and a second connecting link pivotally couples the third arm and the fourth arm together. The relative angular positioning of the arms with respect to the corresponding pivot axes and/or the arm links can be varied to define different vectoring schedules with the mechanism linkage. In one particular form, the nozzle is utilized with a lift fan of an aircraft to perform V/STOL operations.

6 Claims, 5 Drawing Sheets

MECHANISM FOR A VECTORING EXHAUST NOZZLE

CROSS-REFERENCE TO RELATED APPLICATIONS

The present application is a divisional application of U.S. patent application Ser. No. 11/451,835, filed Jun. 13, 2006 now U.S. Pat. No. 7,836,681, and is incorporated herein by reference.

BACKGROUND

The present invention relates to nozzles, and more particularly, but not exclusively relates to a vectoring mechanism for a nozzle.

Aircraft thrust propulsion systems typically employ a nozzle. For some aircraft applications, it is desirable to vector thrust with the nozzle. Typically, existing vectoring schemes have relatively limited adjustability, are exceedingly complex, and/or impose a significant weight penalty. Thus, there remains a demand for further contributions in this area of technology.

SUMMARY

One embodiment of the present invention includes a unique technique to vector thrust with a nozzle. Other embodiments include unique apparatus, devices, systems, and methods involving a vectoring nozzle. Further embodiments, forms, objects, features, advantages, aspects, and benefits of the present application shall become apparent from the detailed description and drawings included herein.

DETAILED DESCRIPTION OF REPRESENTATIVE EMBODIMENTS

Figure 1:
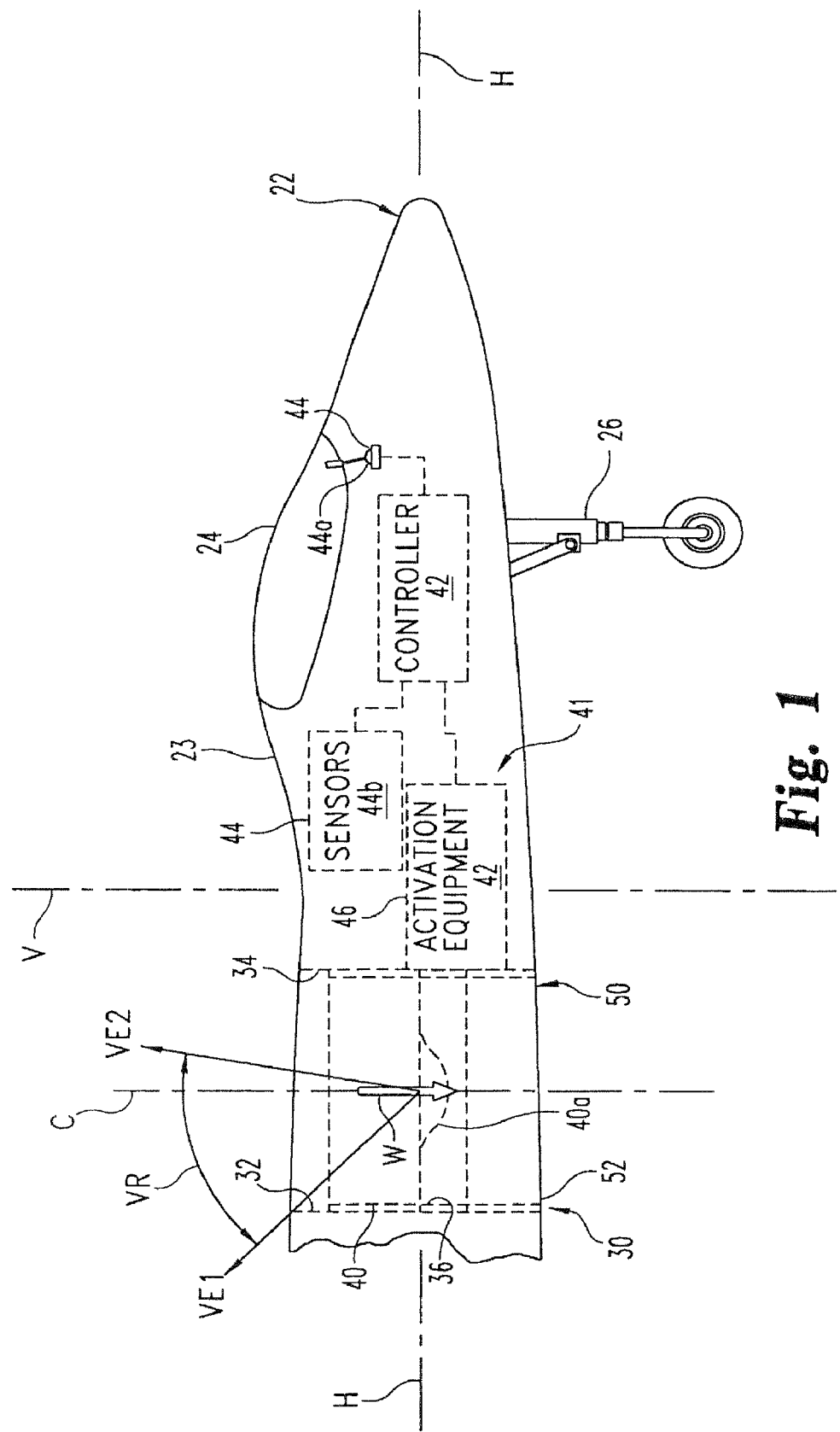
FIG. 1 is a partial, diagrammatic view of a thrust-propelled vehicle includes a vectoring nozzle device.

While the present invention can take many different forms, for the purpose of promoting an understanding of the principles of the invention, reference will made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

One embodiment of the present application includes a nozzle with a thrust vectoring mechanism. This mechanism includes at least three vanes positioned across a passageway of the nozzle, and a linkage to concurrently pivot the vanes. This linkage includes arms fixed to pivot with the vanes and connecting links pivotally interconnecting the arms. In one form, as the vanes pivot, convergence is maintained, and the throat area is changed in accordance with a desired schedule.

FIG. 1 illustrates a vehicle 20 of another embodiment of the present invention. Vehicle 20 is in the form of an aircraft 22, which is partially shown. FIG. 1 shows a fuselage 23 and a cockpit 24 of aircraft 22 while parked on the ground with landing gear 26 deployed. In correspondence to a level, parked position; FIG. 1 also displays horizontal axis H and vertical axis V relative to aircraft 22. It should be appreciated that the H and V axes generally apply to a nominal level cruise mode of aircraft operation. In one form, aircraft 22 is of a high performance type with propulsion provided by one or more gas turbine engines (not shown). An aft portion of aircraft 22 is not shown, being of a conventional nature such as the aircraft shown in U.S. Pat. No. 5,209,428 to Bevilaqua et al, or U.S. Pat. No. 5,760,317 to Sokhey et al., both of which are hereby incorporated by reference each in its entirety.

Aircraft 22 is of a Vertical/Short Take-Off and Landing (V/STOL) type. To assist with V/STOL operation, aircraft 22 includes a thrust vectoring system 30. System 30 includes cavity 32 defined through fuselage 23, which is shown in phantom. Cavity 32 has intake opening 34 and discharge passage 36. System 30 also includes working fluid source 40 positioned along axis V in cavity 32 and vectoring nozzle device 50 aligned therewith to define a working fluid discharge outlet 52. Source 40 and nozzle device 50 are also shown in phantom in FIG. 1. Nozzle device 50 is positioned in cavity 32 and at least partially defines discharge passage 36—receiving working fluid from source 40 for discharge through outlet 52 to provide vectored thrust during V/STOL operation. The direction of flow of this working fluid is indicated by arrow W. Source 40 may be a lift-fan of a "cold flow" type powered through a mechanical linkage to a power source, such as one or more gas turbine engines that otherwise provide forward thrust, may be a type of gas turbine engine itself that provides a "hot flow" of working fluid, or may be differently arranged as would be known to those skilled in the art. Source 40 is illustrated with centerbody 40a (also shown in phantom) that extends into passage 36. Source 40 and centerbody 40a each have a generally circular cross-section taken along centerline axis C that is generally parallel to vertical axis V for the level parked position shown in FIG. 1

System 30 further includes a control subsystem 41. Subsystem 41 includes a controller 42, input devices 44 and actuation equipment 46. Devices 44 include at least one pilot control 44a shown in cockpit 24 and one or more sensors 44b that are depicted schematically. Input devices 44 provide corresponding input signals to controller 42 in a compatible signal format. Controller 42 monitors aircraft performance through such inputs, and selectively provides corresponding output control signals to various devices including nozzle actuation equipment 46. Actuation equipment 46 responds to these output signals to adjust vectoring operation of nozzle device 50 as will be more fully explained hereinafter.

Controller 42 is typically positioned in an avionics bay as schematically shown in FIG. 1, and may be a single component, or a collection of operatively coupled components. When of a multi-component form, controller 42 may have one or more components remotely located relative to the others. Controller 42 may be comprised of digital circuitry, analog circuitry, or a hybrid combination of both of these types. Also, controller 42 may be programmable, an integrated state machine, or a hybrid combination thereof. Controller 42 may include one or more Arithmetic Logic Units (ALUs), Central Processing Units (CPUs), memories, limiters, oscillators, control clocks, amplifiers, signal conditioners, filters, format converters, communication ports, or the like which are not shown to preserve clarity. In one form, controller 42 is of a programmable variety that executes algorithms and processes data in accordance with operating logic that is defined by programming instructions (such as software or firmware). Alternatively or additionally, operating logic for controller 42 can be at least partially defined by hardwired logic or other hardware. In one particular form, controller 42 is configured to operate as a Full Authority Digital Engine Control (FADEC); however, in other embodiments it may be organized/configured in a different manner as would occur to those skilled in the art. As an addition or alternative to circuitry, controller 42 may include one or more electromagnetic, mechanical, hydraulic, pneumatic, or optical elements desired to interface/control devices 44 and equipment 46. It should be appreciated that controller 4 may be exclusively dedicated to nozzle device control/activation, or may further be used in the regulation/control/activation of one or more other subsystems or aspects of aircraft 22.

Figure 2:
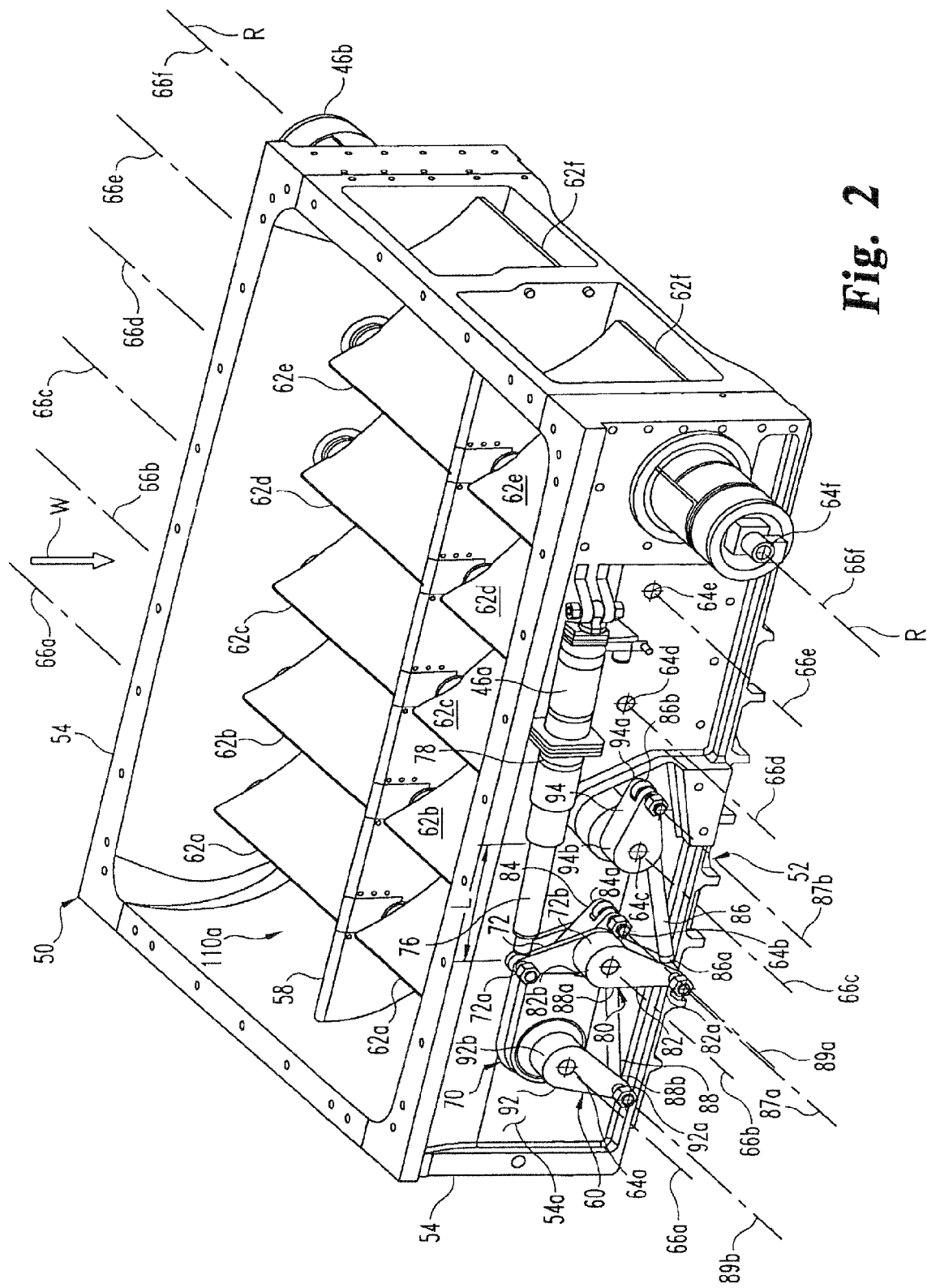
FIG. 2 is a perspective view of the vectoring nozzle device of FIG. 1.
Figure 3:
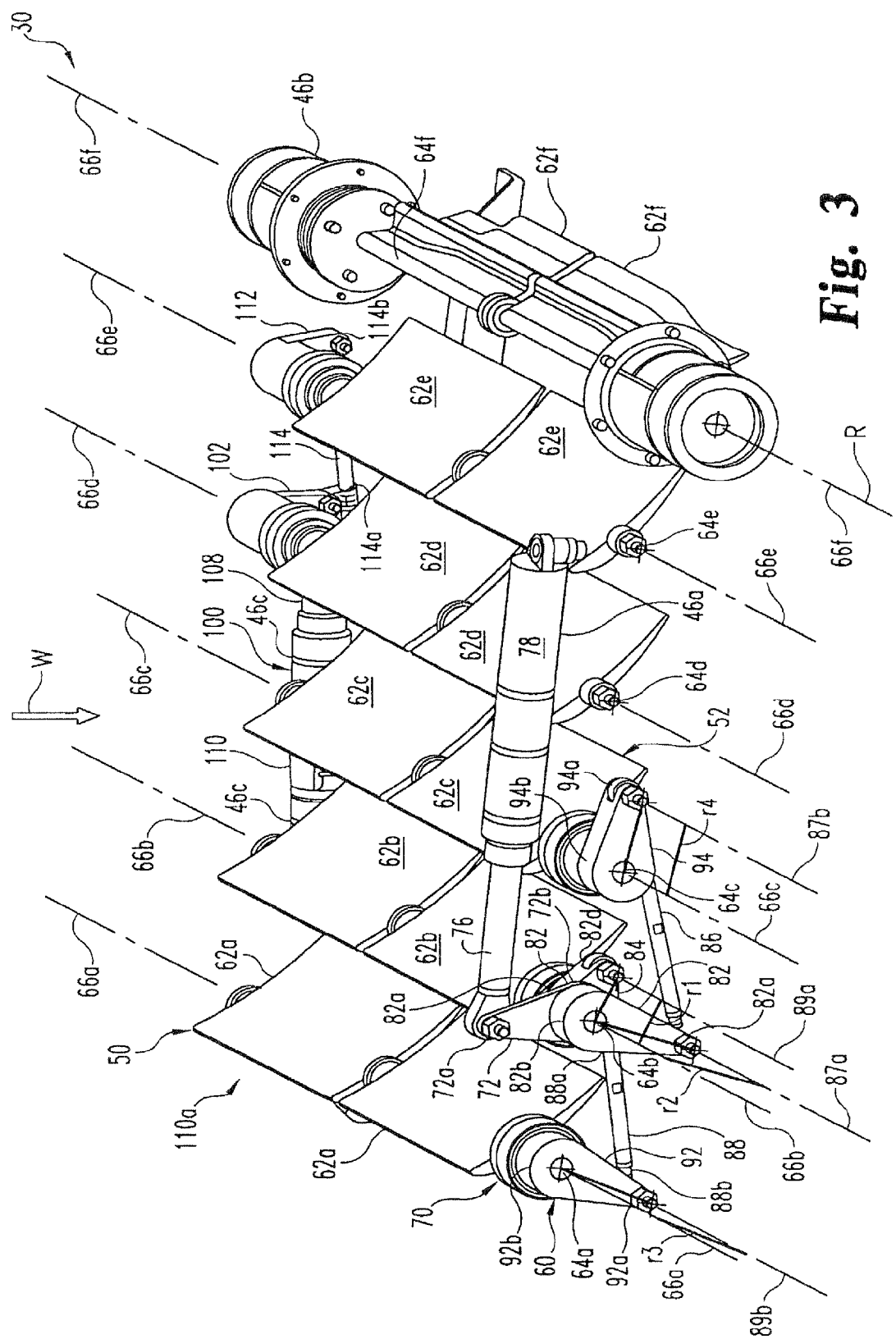
FIG. 3 is a partial perspective view of the vectoring mechanism for the nozzle device of FIGS. 1 and 2.

Referring additionally to FIGS. 2-5, further details regarding system 30 are depicted; where like reference numerals refer to like features. FIGS. 2 and 3 depict nozzle device 50 in a perspective view with certain wall structure 54 being shown in FIG. 2 and being removed in FIG. 3 to provide comparative views. Actuation equipment 46 includes actuators 46a, 46b, and 46c. Actuator 46a has a linear actuation range along axis L, and actuator 46b has a pivot range about rotational axis R. Actuator 46c is of a linear type like actuator 46a, but is obscured by wall structure 54 in the view of FIG. 2 and is partially obscured in the view of FIG. 3. Actuators 46a, 46b, and 46c may each be electromagnetic, hydraulic, pneumatic, a combination of one or more of these types, or such different variety as would occur to those skilled in the art.

Wall structure 54 of nozzle device 50 defines a generally rectangular exit area for discharge outlet 52, sometimes referred to as a two-dimensional (2D) nozzle type. Nozzle device 50 includes a vectoring mechanism 60. Mechanism 60 includes a number of variable pitch vanes 62a, 62b, 62c, 62d, 62e, and 62f (collectively designated vanes 62). Vane 62f is partially obscured by wall structure 54 in FIG. 2, being more visible in FIG. 3. The orientation of vanes 62 is controlled to direct the flow of working fluid as it exits outlet 52. Vanes 62 preferably span across outlet 52 and are airfoil-shaped in a manner configured to provide a desired thrust efficiency and thrust directing capability. Vanes 62 are each pivotally mounted to wall structure 54 by a corresponding mounting shaft 64a, 64b, 64c, 64d, 64e, 64f, 64g, 64h (collectively referred to as shafts 64). Each shaft 64 is journaled to aircraft 22 adjacent each opposing end of the corresponding vane 62 by a suitable pair of journal bearings within opposing wall portions 54a and 54b of wall structure 54. Vanes 62 each pivot about a corresponding pivot axis 66a, 66b, 66c, 66d, 66e, and 66f (collectively referred to as pivot axes 66). It should be understood that rotational axis R is coincident with axis 66f.

Wall structure 54 also includes a center strut 58 that spans across passage 36, separating each of vanes 62 into two generally equally sized portions. Center strut 58 is only shown in FIG. 2—being removed as part of the wall stricture 54 in FIG. 3. A suitable journal bearing is also provided for each of vanes 62 where separated by center strut 58.

Thrust vectoring mechanism 60 further includes adjustment linkage 70 to adjust vanes 62a, 62b, and 62c in concert. Adjustment linkage 70 includes actuation arm 72 fixed in relation to vane 62b and corresponding shaft 64b to pivot together about axis 66b. Actuation arm 72 includes a free end portion 72a opposite a vane mount end portion 72b. End portion 72a is pivotally connected to ram 76 of actuator 46a. In response to appropriate input signals, ram 76 moves in relation to body 78 of actuator 46a to define its linear range of travel, as indicated by L. Body 78 is fixed to portion 54a of wall structure 54.

Linkage 70 further includes a bellcrank structure 80 including coupling arm 82 that has a free end portion 82a radially extending from a vane mount portion 82b. Bellcrank structure 80 also includes coupling arm 84 that has a free end portion 84a radially extending from a vane mount portion 84b. Arms 82 and 84 are fixed relative to arm 72, shaft 64b and vane 62b to pivot therewith about pivot axis 66b.

Linkage 70 further includes longitudinal coupling link 86 with an end portion 86a opposite an end portion 86b, and longitudinal coupling link 88 with an end portion 88a opposite an end portion 88b. End portion 86a is coupled to end portion 82a of arm 82 to pivot about pivot axis 87a. End portion 88a is coupled to end portion 84a of arm 84 to pivot about pivot axis 89a. Arm 82 extends along a radius originating at pivot axis 66b that defines a radial segment r1 from pivot axis 66b to pivot axis 87a, Arm 84 extends along a radius originating at pivot axis 66b that defines a radial segment r2 from pivot axis 66b to pivot axis 89a. Radial segments r1 and r2 are specifically designated in FIG. 3, and are also shown in the diagrammatic views of FIGS. 4 and 5 to be more fully described hereinafter. Radial segments r1 and r2 diner in length and define an oblique angle therebetween. Correspondingly, radial segments r1 and r2 each define a different angle with respect to a common reference axis that is coplanar and intersects axis 66b, such as axes V or H. In one preferred embodiment, r1 and r2 differ in length. In one more preferred embodiment, the length of r1 is less than 90% of the length of r2. In an even more preferred embodiment, r1 is less than 50% of the length of r2. Nonetheless, in other embodiments, the lengths r2 may be approximately the same.

Linkage 70 further includes an arm 92 fixed to vane 62a and shaft 64a to pivot therewith about pivot axis 66a, and an arm 94 fixed to vane 62c and shaft 64c to pivot therewith about pivot axis 66c. Arm 92 has a free end portion 92a that radially extends from vane mount end portion 92b, and arm 94 has a free end portion 94a that radially extends from vane mount end portion 94b. End portion 92a of arm 92 is pivotally coupled to end portion 88b of link 88 to pivot about pivot axis 89b, and end portion 94a of arm 94 is pivotally coupled to end portion 86b of link 86 to pivot about pivot axis 87b. Arm 92 extends from pivot axis 66a to pivot axis 89b defining radial segment r3, and arm 94 extends from pivot axis 66c to pivot axis 87b defining radial segment r4. Radial segments r3 and r4 define an oblique angle therebetween if superimposed to originate at a common pivot axis.

Referring specifically to FIG. 3, mechanism 60 further includes linkage 100 that includes a bellcrank 102 with two arms (partially obscured). These arms are partially obscured, but may resemble arms 82 and 84 of structure 80, and are fixed to pivot with vane 62d and shaft 64d about pivot axis 66d. The arms of bellcrank 102 radially extend away from pivot axis 66d along different radii, and each include a free end portion opposite a vane mount portion. This free end portion of one arm is pivotally coupled to ram 108 of actuator 46c. Ram 108 has a linear range of travel relative to body 110 of actuator 46c. Body 110 is fixed to wall structure 54 along portion 54b. Linkage 100 also includes arm 112 that is fixed to pivot with vane 62e and shaft 64e about pivot axis 66e, and coupling link 114. Arm 112 includes a free end portion opposite a vane mount portion. Coupling link 114 has end portion 114a opposite end portion 114b. End portion 114a is pivotally coupled to the arm of bellcrank 102 that is not journaled to ram 108, and end portion 114b is pivotally coupled to the free end portion of arm 112.

Figure 4:
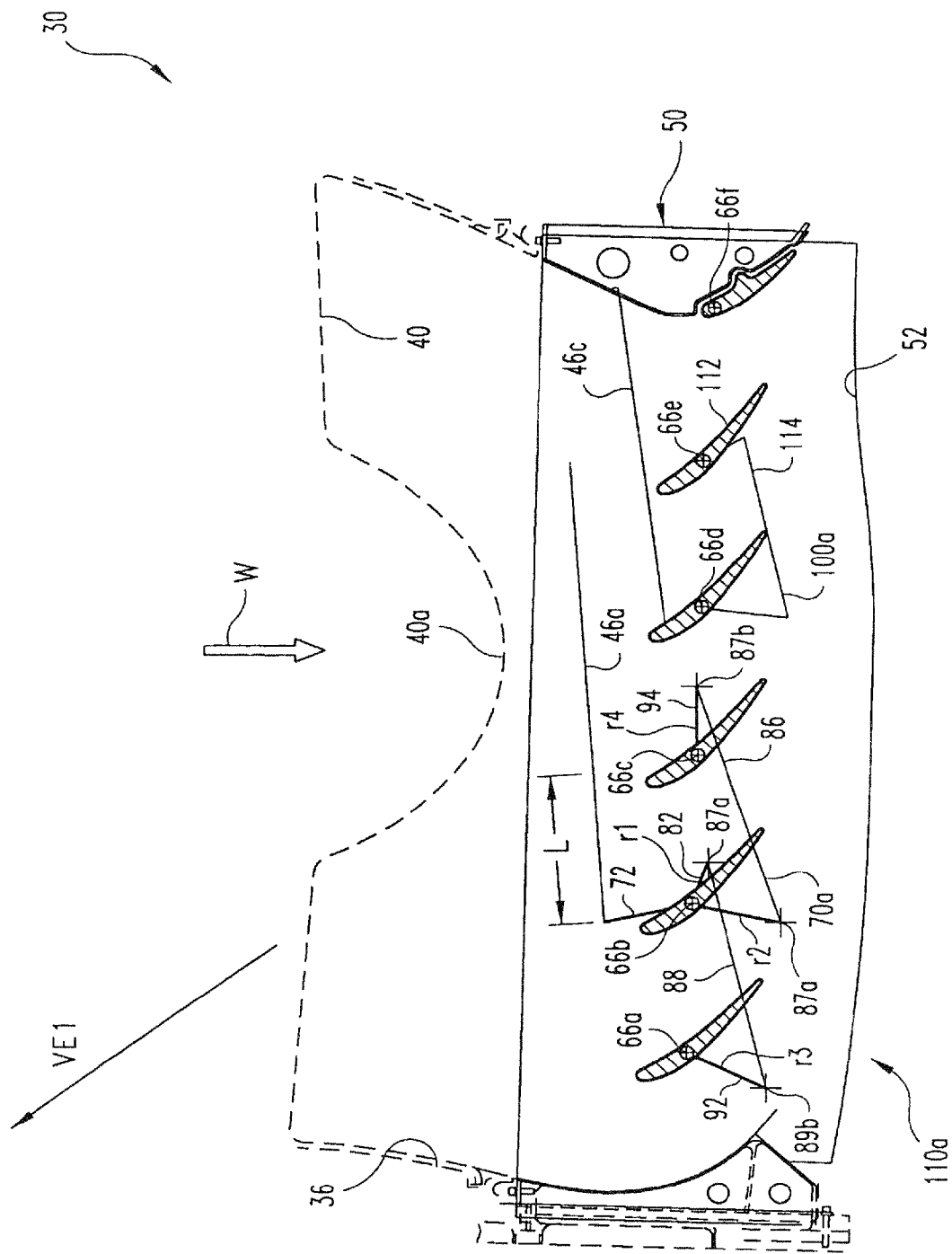
FIG. 4 is a diagrammatic side view of the vectoring nozzle device of FIGS. 1 and 2 with the vectoring mechanism structured to provide a first thrust vector at one extreme of a vectoring range.
Figure 5:
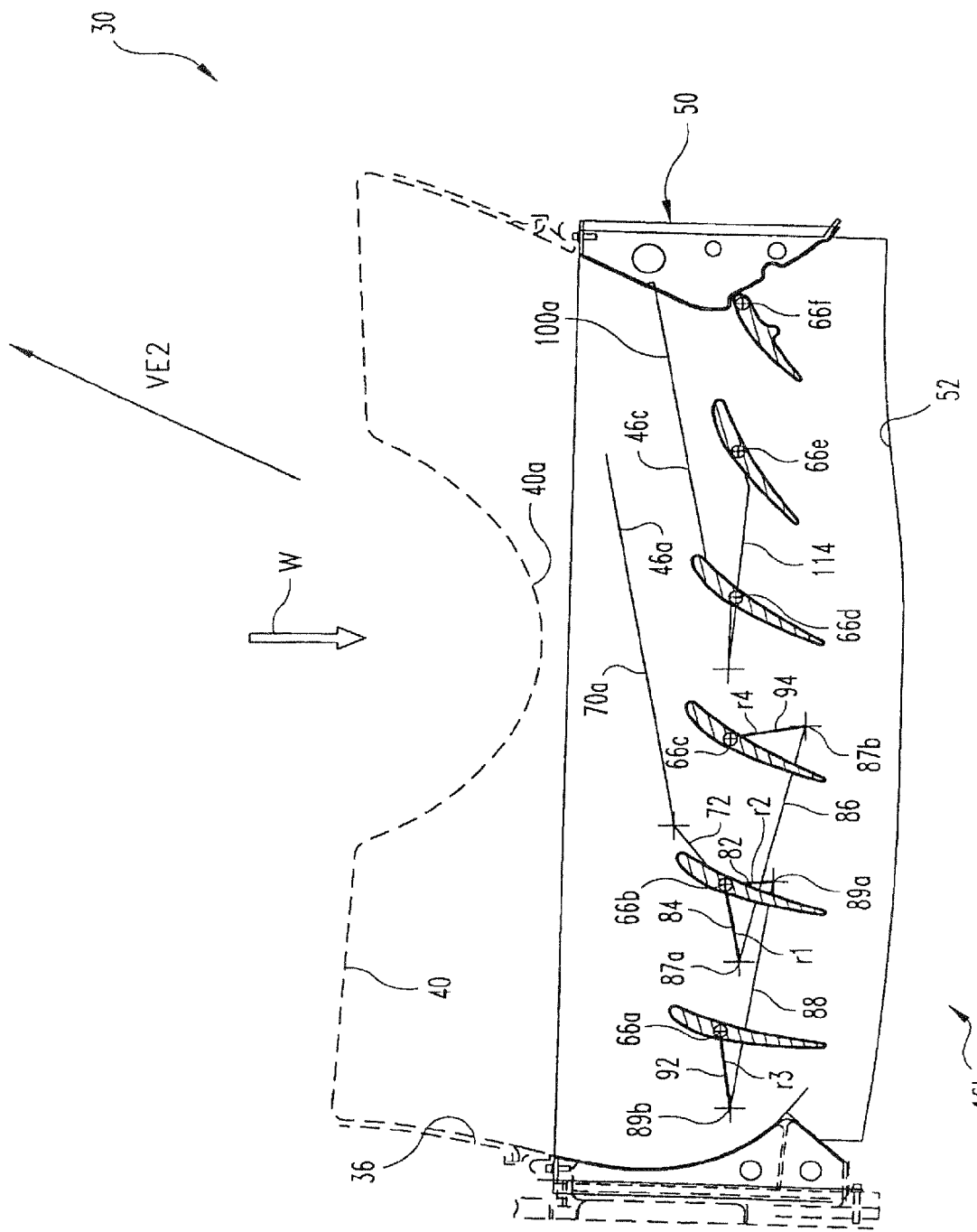
FIG. 5 is a diagrammatic side view of the vectoring nozzle device of FIGS. 1 and 2 with the vectoring mechanism structured to provide a second thrust vector at another extreme of the vectoring range.

FIGS. 4 and 5 provide a partially schematic, sectional view, in which rotational axis and pivot axes 66, 87a, 87b, 89a, and 89b are perpendicular to the view plane, being represented by crosshairs. In FIGS. 4 and 5, like reference numerals refer to like features previously described. Also referring back to FIG. 1, nozzle device 50 provides an angular thrust vector range VR by changing the direction of working fluid as it exits discharge outlet 52 with vanes 62. Different thrust vectors within this range correspond to different pivot configurations of vanes 62 about respective axes 66. A change between different configurations results from a change in position of the movable parts of actuators 46a, 46b, and 46c. Changing the lineal travel of actuators 46a and 46c causes a corresponding change in mechanisms 70 and 100, respectively; while rotation of actuator 46b directly repositions vane 66f.

In FIGS. 4 and 5, linkages 70 and 100 and the respective actuators 46a and 46c are schematically shown as connected line segment patterns symbolic of corresponding kinematic chains 70a and 100a. Vane orientation 110a is shown in FIG. 4. Vane orientation 110a corresponds to one extreme of vector range VR, which is designated as vector VE1. Vane orientation 110a is also depicted in FIGS. 2 and 3. Vane orientation 110a is provided by the maximum length configuration of actuator 46a and actuator 46c, and turning vane 66f to one rotational extreme with actuator 46b. In contrast, FIG. 5 depicts vane orientation 110b. Vane orientation 110b defines an opposite extreme of vector range VR, which is designated is vector VE2. Vane orientation 110b is provided by the minimum length configuration of actuator 46a and actuator 46c, and rotational extreme of vane 66f provided by actuator 46b opposite that in vane orientation 110a.

Referring generally to FIGS. 1-5, operation of aircraft 22 with thrust vectoring system 30 is next described. During operation of thrust vectoring system 30, source 40 provides pressurized working fluid to nozzle device 50 in the direction of arrow W. The pressurized working fluid continues through passage 36, as at least partially defined by device 50, passing between vanes 62 and discharging through outlet 52. By pivoting, vanes 62 in a coordinated manner, the direction of discharge of the working fluid from outlet 52 can be changed. As a result, the directional component of thrust (opposite the direction of the working fluid flow) may be changed. The vane pivot orientation 110a shown in FIGS. 2-4 provides vector VE1 at one extreme of angular vector range VR, and vane pivot orientation 110l) shown in FIG. 5 provides vector VE2 at another extreme of angular vector range VR. For the depicted embodiment, vector VE1 provides a nozzle vector direction of about 41 degrees relative to a 0/180 degree reference along horizontal axis H to provide vertical and aft thrust; where vertical axis V corresponds to 90/270 degrees. Vector VE2 provides a nozzle vector direction of about 104 degrees relative to horizontal axis H to provide vertical and slightly forward thrust. Accordingly, a vector range VR spans about 63 degrees in this embodiment; however, it should be appreciated that other embodiments may have a different range with one or more different extremes.

Vane pivot orientations 110a and 110b correspond to opposite extremes of actuators 46a, 46b, and 46c. Accordingly, vectors between vector VE1 and vector VE2 are provided by corresponding intermediate positions of actuators 46a, 46b, and 46c. It should be appreciated that as actuators 46a, 46b, and 46c move, vanes 62 each pivot about respective pivot axes 66 by different angular amounts as determined by actuator movement and the correspondingly coupled linkages 70 and 100. For the depicted form, vanes 62 are configured to maintain converging passageways between them throughout the vectoring range VR. In other implementations, vanes 62 may be configured so that two or more vanes 62 turn substantially the same angular amount over some or all of the angular thrust vector range VR and/or convergence or some or all of the passageways between vanes 62 may not be maintained over some or all of the angular thrust vector range VR.

In addition to providing a thrust vector range, it is often desirable to control throat area over that range. Typically, throat area control requires that one or more of vanes 62 pivot by a different amount relative to the others as in the case of the depicted embodiment. The two vane orientations 110a and 110b shown in FIGS. 4 and 5 provide one nonlimiting illustration of different degrees of pivoting from one vane 40 to the next to provide a selected throat area schedule during thrust vectoring. Such scheduling may include a predefined change in throat area as thrust vector direction changes. Nozzle throat area control may be performed in terms of various different parameters, including but not limited to geometric throat area, effective throat area, and discharge coefficient of the nozzle to name just a few. It should be understood that changes in effective throat area may not be uniform with respect to changes in the geometric throat area of the nozzle. As used herein, the "discharge coefficient" of a nozzle refers to the ratio between actual mass flow through the nozzle and the ideal or theoretically attainable fluid mass flow through the nozzle. For practical nozzle designs, the discharge coefficient is generally less than one (<1) due to the formation of boundary layers and other non-ideal conditions. The "geometric throat area" of a nozzle refers to the measured throat area of the nozzle configuration. The "effective throat area" of a nozzle refers to a nozzle area that is required to attain a desired actual mass flow rate through a given nozzle configuration and is defined by the expression:

$$\text{effective throat area} = (AFR/IFR) * GTA;$$

where AFR=actual flow rate, IFR=ideal or theoretically attainable flow rate, and GTA=geometric throat area of the nozzle. The term (AFR/IFR) is the discharge coefficient for the given nozzle. For a discharge coefficient less than one (<1), the effective throat area is less than the geometric throat area. Maintaining a generally constant geometric throat area while discharge coefficient varies with chances in vane orientation, typically results in a change in thrust vector magnitude for a constant level of working fluid supplied to the nozzle. In contrast, a generally constant throat area accounts for discharge coefficient changes and results in an approximately constant thrust magnitude for a constant level of working fluid supplied to the nozzle.

In one embodiment of the present invention, an approximately constant effective throat area is maintained to accommodate changes in discharge coefficient over a given profile of nozzle performance. In another embodiment, an approximately constant geometric throat area is provided. In still another embodiment, a throat area schedule is provided as a function of the discharge coefficient that may not maintain a generally constant geometric or effective throat area. In yet other embodiments, a different throat area control arrangement may be utilized as would occur to those skilled in the art or throat area control may not be desired at all.

It should be understood that the concurrent pivoting of vanes 62a-62c with different relative amounts of angular turning is determined by the kinematics of linkage 70. For linkage 70, differences in length and angular spacing of arms 72, 82, 84, 92, and 94, and the length of coupling links 86, 88, and 114 between pivot connections of the respective arms define a particular schedule of vector and throat area. Linkage 100 operates in a similar manner, but involves fewer vanes (vanes 62d and 62e). In one alternative embodiment, a single linear actuator is used in lieu of actuator 46a and 46c with appropriate mechanical coupling between linkages 70 and 100.

Because vane 62f is the only vane configured to rotate in response to actuator 46b, it can be controlled independent of the others. As a result, vane 62f can be used to trim the throat area to a desired schedule otherwise provided with vanes 62a-62e Over the pivoting range. This trimming vane arrangement may be used to accommodate nonlinear changes that may be more awkward to address with mechanical linkage. Nonetheless, in other embodiments, more or fewer independently pivotable vanes can be included for trimming or other desired application. Additionally or alternatively, coupling to other linkage can be used to rotate vane 66f with actuator 46a or actuator 46e instead of actuator 46b.

Controller 42 can be arranged to generate one or more thrust control output signals to control actuators 46a-46c and correspondingly provide a desired vane orientation. The output signals can be a function of one or more steering signals from control 44a, one or more sensor signals from sensors 44h, or a combination of these. For instance, controller 42 can provide one or more actuator output signals in response to such signals to provide a stable hover mode of operation; direct aircraft 22 along a desired heading; initiate V/STOVL operation; and/or provide a smooth transition between cruise and V/STOVL operating modes. Examples of sensor-based signals to which controller 42 could be responsive include rate of travel; degree to which the aircraft is level, such as pitch and roll position of the aircraft; acceleration; weight; balance; threat avoidance; weight-on-wheels, and such other aircraft parameters as would occur to those skilled in the art.

Many other embodiments of the present invention are envisioned. For example, thrust vectoring mechanisms of the present invention are provided for a passage through a different part of an aircraft in another embodiment, which correspondingly changes its vectoring characteristics. For instance, vectoring mechanisms of the present invention may be applied to an axial discharge nozzle utilized to propel an aircraft during cruise mode operation. This alternative nozzle embodiment may or may not include a turning hood to facilitate V/STOVL operation. Moreover, the teachings of the present invention may be utilized in aircraft other than V/STOVL types. In further examples, the number of vanes can be more or fewer, and/or vanes can be utilized in combination with other working fluid directing techniques as are known to those skilled in the art. In one alternative utilizing, a working fluid at high temperature, a mixer/ejector is also incorporated into the thrust vectoring nozzle.

A further example of the present invention includes a nozzle device defining a passageway that has an outlet to discharge working fluid to produce thrust. This device also includes a vectoring mechanism having three vanes pivotally mounted across the passageway and a linkage. This linkage includes a first arm fixed to a first one of the vanes to pivot therewith about a first pivot axis, a second arm and a third arm fixed relative to one another and to a second one of the vanes to pivot therewith about a second pivot axis, a fourth arm fixed to a third one of the vanes to pivot therewith about a third pivot axis. The linkage also includes a first connecting link pivotally coupled to the first arm and the second arm and a second connecting link pivotally coupled to the third arm and the fourth arm. The second arm extends along a first radial axis and the third arm extends along a second radial axis. The first and second radial axes are each perpendicular to the second pivot axis and intersect the second pivot axis at a common point to form a desired angle therebetween. An actuator engages the linkage that is responsive to one or more input signals to cause the vanes to rotate together in accordance with a desired schedule.

Another example comprises: discharging working fluid through a passageway of a nozzle to produce thrust that includes three or more vanes pivotally mounted across the passageway in a linkage pivotally interconnecting the vanes, pivoting the vanes together over a range of travel to provide different thrust vectors with each of the vanes turning a different angular amount over the range of travel, and changing nozzle throat area defined with the vanes while maintaining, a convergent relationship between the vanes during the pivoting of the vanes over the range of travel. In one form, the linkage includes a first arm fixed to the first one of the vanes to pivot therewith, a second arm and a third arm fixed to a second one of the vanes to pivot therewith, and a fourth arm fixed to a third one of the vanes to pivot therewith. Also included can be a first connecting link journal to the first arm and the second arm and a second connecting link journaled to the third arm and the fourth arm.

Yet another example includes an aircraft. This aircraft comprises a thrust mechanism including means for discharging working fluid through a passageway of a nozzle to produce thrust that includes three or more vanes pivotally mounted thereacross, means for pivoting the vanes together over a range of travel to provide different thrust vectors with each of the vanes turning a different angular amount over the range of travel, and means for changing nozzle throat area defined with the vanes while maintaining a convergent relationship between the vanes during the pivoting of the vanes over the range of travel. In one form, the linkage interconnecting the vanes includes a first arm fixed to a first one of the vanes to pivot therewith, a second arm and a third arm fixed to a second one of the vanes to pivot therewith, and a fourth arm fixed to a third one of the vanes to pivot therewith.

Still another example includes: a nozzle device defining a passageway having an outlet to discharge working fluid to produce thrust. This device further includes a vectoring mechanism with three vanes pivotally mounted across the passageway and a linkage pivotally coupling the vanes together. This linkage includes a first arm fixed to a first one of the vanes to pivot therewith about a first pivot axis, a second arm and a third arm fixed to a second one of the vanes to pivot therewith about a second pivot axis, and a fourth arm fixed to a third one of the vanes to pivot therewith about a third pivot axis. Also included in the linkage is a first connecting link coupled to the first arm to pivot about a first pivot point and the second arm to pivot about a second pivot point, and a second connecting fink coupled to third arm to pivot about a point sand the fourth arm to pivot about a fourth pivot point. In one nonlimiting form, a first radial segment extends from the first pivot axis to the first pivot point and forms a first angle with a first vertical reference axis intersecting the first pivot axis. A second radial segment extends a first distance front the second pivot axis to the second pivot point and the third radial segment extends a second distance from the second pivot axis to the third pivot point. This second distance is less than about 90% of the first distance. A fourth radial segment extends from the fourth pivot axis to the fourth pivot point and forms a second angle with a second vertical reference axis intersecting the third pivot axis. This second angle differs from the first angle by at least 10 degrees. Nonetheless, in other embodiments, the angular difference and/or the difference in distances can vary as would occur to those skilled in the art.

In a further example, an apparatus comprises a nozzle device defining a passageway with an outlet to discharge a working fluid to produce thrust. The nozzle device includes a vectoring mechanism that has a first vane mounted across the passageway to pivot about a first pivot axis, and a bellcrank fixed to the first vane to pivot therewith about the first pivot axis. The bellcrank includes a first arm extending along a first radial axis from the first pivot axis to a first free end portion and a second arm extending along a second radial axis from the first pivot axis to a second free end portion. The first radial axis and the second radial axis are each perpendicular to the first pivot axis and intersect the first pivot axis. The first arm and the second arm are fixed in relation to one another to define a fixed angle between the first radial axis and the second radial axis. Also included is a second vane mounted across the passageway to pivot about a second pivot axis, and a first linkage including a first arm link fixed to the second vane to pivot therewith about the second pivot axis, and a first connecting link. The first arm link extends from the second pivot axis to a first connector engagement portion. The first connecting link is pivotally connected to the first connector engagement portion and the first free end portion of the first arm. Furthermore, this example includes a third vane mounted across the passageway to pivot about a third pivot axis, and a second linkage including a second arm link fixed to the third vane to pivot therewith about the third pivot axis, and a second connecting link. The second arm link extends from the third pivot axis to a second connector engagement portion. The second connecting link is pivotally connected to the second connector engagement portion and the second free end portion of the second arm.

Still a further example is directed to a nozzle device defining a passageway with an outlet to discharge a working fluid to produce thrust. The nozzle device includes a vectoring mechanism that has three vanes pivotally mounted across the passageway and linkage pivotally coupling the vanes together. The linkage includes: a bellcrank fixed to a first one of the vanes to pivot therewith about a first pivot axis. The bellcrank includes a first arm extending along a first radius perpendicular to the first pivot axis and a second arm extending along a second radius perpendicular to the first pivot axis. The first radius and the second radius each intersect the first pivot axis. The first arm and the second arm are fixed in relation to one another. A first arm link is fixed to a second one of the vanes to pivot therewith about a second pivot axis and a first connecting link is pivotally connected to the first arm link and the first arm. A second arm link is fixed to a third one of the vanes to pivot therewith about a third pivot axis, and a second connecting link is pivotally connected to the second arm link and the second arm. An actuator is engaged to the linkage that is responsive to one or more input signals to cause the vanes to rotate together in accordance with a desired schedule.

Any theory, mechanism of operation, proof, or finding stated herein is meant to further enhance understanding or the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading, the claims it is intended that when words such as "a," "an," "at least one," "at least a portion" are used there no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
   discharging working fluid through a passageway of a nozzle to produce thrust, the nozzle including three or more vanes pivotally mounted across the passageway and a linkage pivotally interconnecting the vanes, the linkage including a first arm fixed to a first one of the vanes to pivot therewith, a second arm and a third arm each fixed to a second one of the vanes to pivot therewith, a fourth arm fixed to a third one of the vanes to pivot therewith, a first connecting link journaled to the first arm and the second arm, and a second connecting link journaled to the third arm and the fourth arm;
   pivoting the vanes together over a range of travel to provide different thrust vectors, the vanes each turning a different angular amount over the range of travel; and
   during the pivoting of the vanes over the range of travel, changing nozzle throat area defined with the vanes while maintaining a convergent relationship between the vanes.

2. The method of claim 1, wherein the range of travel corresponds to a thrust vector range of at least 60 degrees.

3. The method of claim 1, which includes operating a linear actuator journaled to the linkage to perform the pivoting of the vanes.

4. The method of claim 3, wherein the vanes number at least five and a fourth one of the vanes and a fifth one of the vanes are moved with another linkage.

5. The method of claim 4, wherein the nozzle is of a 2D type coupled to a lift fan of an aircraft, the vanes number at least six, and further comprising rotating a sixth one of the vanes with a rotary actuator.

6. The method of claim 1, wherein the linkage includes a fifth arm fixed to the second vane, the fifth arm is pivotally coupled to an actuator to cause the pivoting of the vanes, the second arm, the third arm, and the fifth arm each radially extending away from the second pivot axis at a different angle relative to a vertical reference axis perpendicularly intersecting the second pivot axis.

* * * * *